United States Patent
Jones, III

(10) Patent No.: US 7,147,774 B2
(45) Date of Patent: Dec. 12, 2006

(54) SLIDING PLATE FILTER WITH SEGMENTED SEALING RING

(75) Inventor: Howland B. Jones, III, Eugene, OR (US)

(73) Assignee: Polymer Systems, Inc., Hickory, NC (US)

(*) Notice: Subject to any disclaimer, the term of this patent is extended or adjusted under 35 U.S.C. 154(b) by 165 days.

(21) Appl. No.: 10/410,968

(22) Filed: Apr. 10, 2003

(65) Prior Publication Data

US 2004/0200784 A1  Oct. 14, 2004

(51) Int. Cl.
*B01D 29/50* (2006.01)
*B01D 29/96* (2006.01)

(52) U.S. Cl. ............... 210/236; 210/330; 210/359; 277/546; 277/632; 425/199; 425/DIG. 47

(58) Field of Classification Search .......... 210/236, 210/251, 359, 416.1, 450, 499; 425/199; 277/632
See application file for complete search history.

(56) References Cited

U.S. PATENT DOCUMENTS

| | | | | |
|---|---|---|---|---|
| 2,590,696 A | * | 3/1952 | Gregoire | 277/553 |
| 2,661,497 A | * | 12/1953 | Birmingham | 425/186 |
| 3,145,746 A | * | 8/1964 | Scher | 210/447 |
| 3,583,453 A | * | 6/1971 | Upmeier | 425/186 |
| 3,642,295 A | * | 2/1972 | Cohen | 277/632 |
| 3,653,419 A | * | 4/1972 | Schutter | 210/447 |
| 3,675,934 A | * | 7/1972 | Heston | 210/447 |
| 3,684,419 A | * | 8/1972 | Voight | 425/192 R |
| 3,752,635 A | * | 8/1973 | Hinrichs | 425/461 |
| 3,822,977 A | * | 7/1974 | Hinrichs | 425/326.1 |
| 3,833,247 A | * | 9/1974 | Puskas | 285/414 |
| 3,856,277 A | * | 12/1974 | Tiramani | 210/447 |
| 3,947,202 A | * | 3/1976 | Goller et al. | 425/185 |
| 3,962,092 A | * | 6/1976 | Newman, Jr. | 210/236 |
| 3,983,038 A | * | 9/1976 | Heston | 210/447 |
| 4,059,525 A | | 11/1977 | Krasnow | |
| 4,130,285 A | * | 12/1978 | Whitaker | 277/641 |
| 4,237,014 A | | 12/1980 | Trott | |
| 4,358,262 A | * | 11/1982 | Herbert | 425/185 |
| 4,359,387 A | | 11/1982 | Trott | |
| 4,470,607 A | | 9/1984 | Schier et al. | |
| 4,507,072 A | * | 3/1985 | Gaul, Jr. | 425/185 |

(Continued)

OTHER PUBLICATIONS

Definitions of "rigid" taken from Dictionary.com on May 8, 2006.*

*Primary Examiner*—Robert James Popovics
*Assistant Examiner*—T. Woodruff
(74) *Attorney, Agent, or Firm*—Jenkins, Wilson, Taylor & Hunt, P.A.

(57) ABSTRACT

A filtration apparatus for use in polymer processing includes a housing having an internal bore for directing polymer flow and a channel oriented transversely to the bore. A slide plate for supporting filters is movable through the channel and across the bore. An annular upstream seal ring sealably contacts the slide plate. A surface of the upstream seal ring facing the upstream direction is angled with respect to the bore. A plurality of ring segments are arranged to form an annular segmented ring. The segmented ring presents a tapered ring surface that is generally complimentarily angled relative to the angled surface of the upstream seal ring. Pressurized polymer flowing through the bore imparts radially forces on the ring segments, causing the ring segments to impart axial forces on the upstream seal ring to enhance the seal interface between the upstream seal ring and the slide plate.

24 Claims, 9 Drawing Sheets

U.S. PATENT DOCUMENTS

| | | | | |
|---|---|---|---|---|
| 4,552,522 A | * | 11/1985 | Van Melle | 425/182 |
| 4,592,558 A | * | 6/1986 | Hopkins | 277/572 |
| 4,618,154 A | * | 10/1986 | Freudenthal | 277/556 |
| 5,439,589 A | * | 8/1995 | Whitman | 210/436 |
| 5,507,498 A | * | 4/1996 | Trott | 277/300 |
| 5,783,223 A | | 7/1998 | Anderson | |
| 5,840,197 A | * | 11/1998 | Ishida et al. | 210/780 |
| 6,010,625 A | * | 1/2000 | Whitman | 210/236 |
| 6,168,411 B1 | | 1/2001 | Wildman | |
| 6,238,558 B1 | * | 5/2001 | Kelley | 210/236 |
| 6,260,852 B1 | * | 7/2001 | Reineke | 277/609 |
| 6,270,703 B1 | | 8/2001 | Wildman et al. | |
| RE37,681 E | * | 4/2002 | Yoshii et al. | 425/185 |
| 6,500,336 B1 | * | 12/2002 | Gneuss | 210/236 |
| 2004/0200784 A1 | * | 10/2004 | Jones, III | 210/767 |

* cited by examiner

SLIDING PLATE FILTER WITH SEGMENTED SEALING RING

TECHNICAL FIELD

The present invention generally relates to the filtering of a flowable material such as molten polymer. More specifically, the present invention relates to the sealing of a filtration apparatus to prevent leakage and degradation of the material flowing therethrough.

BACKGROUND ART

Polymer extrusion systems are well known and used for applications such as the manufacture of extruded polymer components. In a typical application, polymer feedstock particles are combined and heated in an extruder device to produce a stream of molten polymer. The polymer extrudate is then driven under pressure to an appropriate downstream module. As one example, the polymer extrudate can be fed to a die to shape the polymer into a sheet, tube or other desired profile. In a typical polymer processing system, a filtration device is placed in-line between the extruder and the downstream module to filter the polymer extrudate and thereby improve its quality and uniformity. Typically, the filtration device includes two breaker plates that contain screens as filter elements. The filtration device typically includes an internal bore through which the polymer material flows, and a screen changing device that is movable across the bore to position one breaker plate in-line with the polymer flow while the other breaker plate is offline and thus accessible for cleaning or replacement.

The screen changing device thus necessarily interacts with the in-line bore of the filtration device. Moreover, the screen changing device is typically designed to perform a screen changing task during the operation of the processing system, and hence while polymer melt continues to flow through the filtration device. Accordingly, it is important that the filtration device be equipped with a suitable means for sealing the filtration device against the loss of polymer material from the bore. In particular, internal areas of the filtration device present the opportunity for polymer material to "hang-up" and stagnate, thereby reducing the quality and uniformity of the polymer material being processed.

Filtration devices in the past have offered various sealing approaches. Examples are disclosed in U.S. Pat. Nos. 6,270,703; 6,238,558; 6,168,411; 6,010,625; 5,783,223; 5,507,498; 4,470,607; 4,359,387; 4,237,014; 4,059,525; 3,962,092; and 3,675,934. U.S. Pat. No. 6,238,558 discloses a filter changer in which an upstream seal ring is adjustably compressed by screws oriented transversely to the direction of polymer flow. This design requires the use of a tool to adjust several screws, and the screws are of a nonstandard customized design that adds costs to the filtration device. U.S. Pat. No. 6,010,625 discloses an upstream seal that is constructed from a polymeric material. It is generally known that polymeric seals of this type are not suitable for use in environments where operating temperatures exceed 450–550° F. Moreover, the effectiveness of the seal requires polymer material flowing through the disclosed filtration device to be deliberately diverted into gaps, which is considered undesirable because the diverted polymer material can become degraded while stagnating in the gaps. U.S. Pat. No. 5,507,498 discloses a filtration device in which a C-shaped spring is used for sealing purposes. The C-shape of the spring thus requires a gap to exist between the cross-sectional ends of the spring. By design, some of the polymer material flowing through the filtration device migrates to the outer diameter of an upstream seal interacting with the spring, where such polymer material degrades and is then introduced back into the melt stream. U.S. Pat. Nos. 4,359,387 and 4,237,014 disclose a filtration device in which a Belleville-type spring is interposed between an upstream seal and an adapter component. It is believed that this design does not sufficiently prevent the leakage of polymer material. Other approaches, such as the O-rings, to enhance sealing within filtration devices do not sufficiently prevent polymer leakage and are not suitable for the high-temperature (e.g., 450–550° F. or greater) operating environments increasingly encountered in polymer processing applications.

In view of the foregoing brief discussion of prior art, it is widely accepted among persons skilled in the art that, despite past efforts, an ongoing need exists to provide filtration devices of the screen-changing type with improved sealing arrangements and methods.

SUMMARY OF THE INVENTION

According to one embodiment, a filtration apparatus for use in polymer processing systems comprises a housing, a slide plate for supporting filters, an upstream seal ring, and a plurality of ring segments. The housing has an internal bore for directing a polymer flow and a channel oriented transversely to the bore. This slide plate is movable through the channel and across the bore, and comprises an upstream slide plate surface and a downstream slide plate surface. The upstream seal ring is annularly disposed about a central bore axis of the bore. The upstream seal ring comprises first and second opposing upstream seal surfaces. The first upstream seal surface faces downstream for sealably contacting the upstream slide plate surface. The second upstream seal surface is angled with respect to the bore axis. The ring segments are arranged in contact with each other to form a segmented ring that is annularly disposed about the bore axis. Each ring segment comprises a tapered ring surface that is generally complementarily angled relative to and sealably contacting the second upstream seal surface.

According to another embodiment, the filtration apparatus additionally comprises a downstream seal ring and an adjustment ring, both of which annularly disposed about the bore axis. The downstream seal ring comprises a first downstream seal surface facing upstream for sealably contacting the downstream slide plate surface, and an opposing second downstream seal surface. The adjustment ring sealably contacts the second downstream seal surface. The adjustment ring is axially adjustable along the bore for biasing the downstream seal ring against the slide plate.

According to yet another embodiment, the filtration apparatus additionally comprises a connector ring that is annularly disposed about the bore axis. The connector ring sealably contacts the ring segments, such that the ring segments axially interposed between the upstream seal and the connector ring.

According to a further embodiment, the connector ring comprises a biasing device that contacts the ring segments for axially biasing the ring segments against the upstream seal. In one aspect, the biasing device comprises a plurality of biasing components circumferentially arranged about the bore axis. The biasing components can be compression springs.

According to a further aspect of any of the embodiments disclosed herein, the ring segments are constructed from a metal such as steel.

Also disclosed herein is a method for sealing a filtration apparatus to reduce leakage and degradation of polymer flowing therethrough. According to this method, an annular upstream seal ring is placed in a polymer flow bore of a filtration apparatus. The upstream seal ring is disposed upstream from a channel oriented transversely to the bore. The upstream seal ring comprises a first upstream seal surface generally facing the channel and an opposing second upstream seal surface angled with respect to a central bore axis of the bore. An annular segmented ring is sealed against the upstream seal ring. The segmented ring comprises a plurality of ring segments fitted together. Each ring segment comprises a tapered ring surface that is generally complementarily angled relative to the second upstream seal surface. Each tapered ring surface contacts the second upstream seal surface. A polymer is flowed through the bore at a polymer flow pressure. The polymer imparts force components directed radially outwardly relative to the bore axis to each ring segment. Each ring segment imparts an axially downstream directed force component against the second upstream seal surface of the upstream seal ring.

Accordingly, it is an object of the present invention to provide a filtration apparatus with a sealing arrangement that reduces or prevents the leakage and degradation of a polymer material flowing through the filtration apparatus.

An object of the invention having been stated hereinabove, and which is addressed in whole or in part by the present invention, other objects will become evident as the description proceeds when taken in connection with the accompanying drawings as best described hereinbelow.

DETAILED DESCRIPTION OF THE INVENTION

Figure 1A:
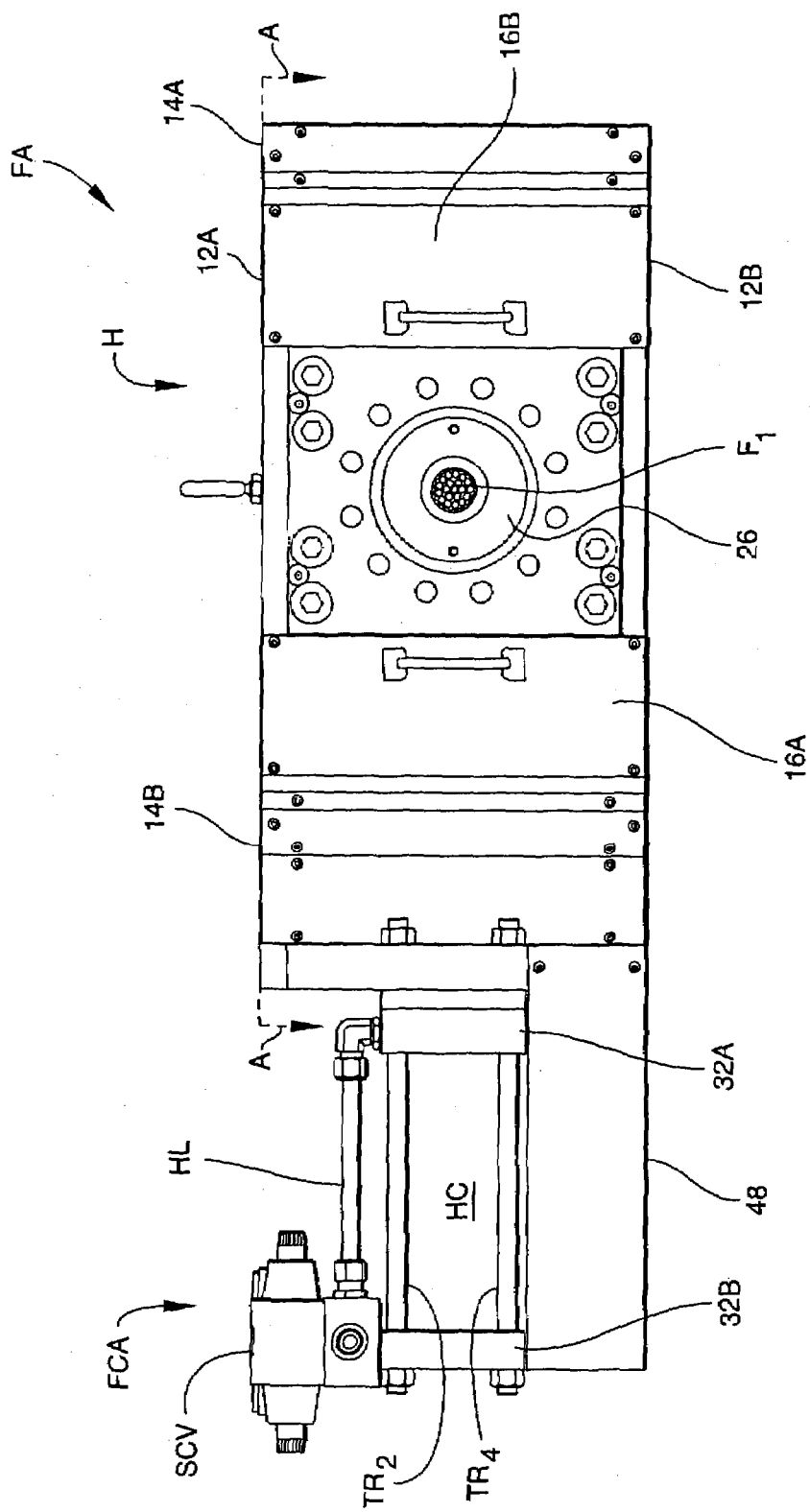
FIG. 1A is a rear (downstream-side) elevation view of a filtration apparatus disclosed herein.
Figure 1B:
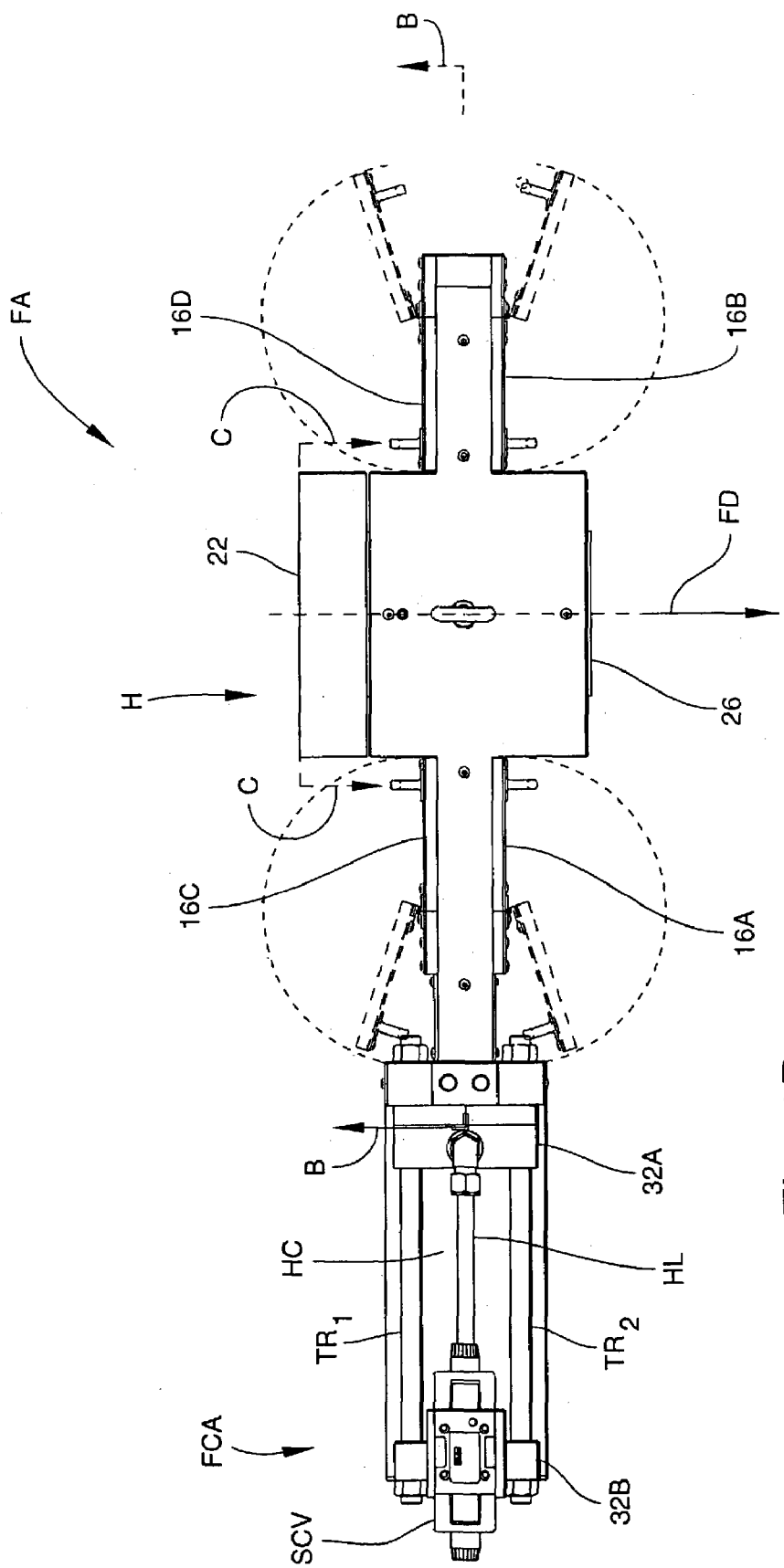
FIG. 1B is a top plan view of the filtration apparatus.

Referring to FIGS. 1A and 1B, a filtration apparatus, generally designated FA, is illustrated according to one exemplary embodiment. In general, filtration apparatus FA can be employed in one or more types of polymer processing systems in which filtration of a stream of heated polymer melt or extrudate is desired. As one typical yet non-limiting example of a polymer processing application generally known to persons skilled in the art, pelletized or granulated polymer feedstock is loaded into a hopper (not shown) from which the feedstock is delivered to an extruder (not shown). The extruder typically includes a motor-powered auger or screw and a means for heating and melting the feedstock to form a flowable polymer melt. The polymer melt exits the extruder and flows toward filtration apparatus FA. A suitable polymer pressurizing and transport means such as a motor-powered gear pump (not shown) can be provided to assist in driving and pressurizing the polymer melt. Depending on the application, such a gear pump if used can be installed either upstream or downstream from filtration apparatus FA. While the heated, pressurized polymer melt flows through filtration apparatus FA, filtration apparatus FA prevents hardened or agglomerated polymeric material, or other undesirable constituents, from passing to the downstream side. From filtration apparatus FA, the filtered polymer melt is flowed to any suitable downstream device or site, one example being a die (not shown) from which polymeric sheets, tubes, or other profiles can be extruded. The flow of polymeric material occurs in an in-line flow direction represented in FIG. 1B by an arrow FD.

Figure 1C:
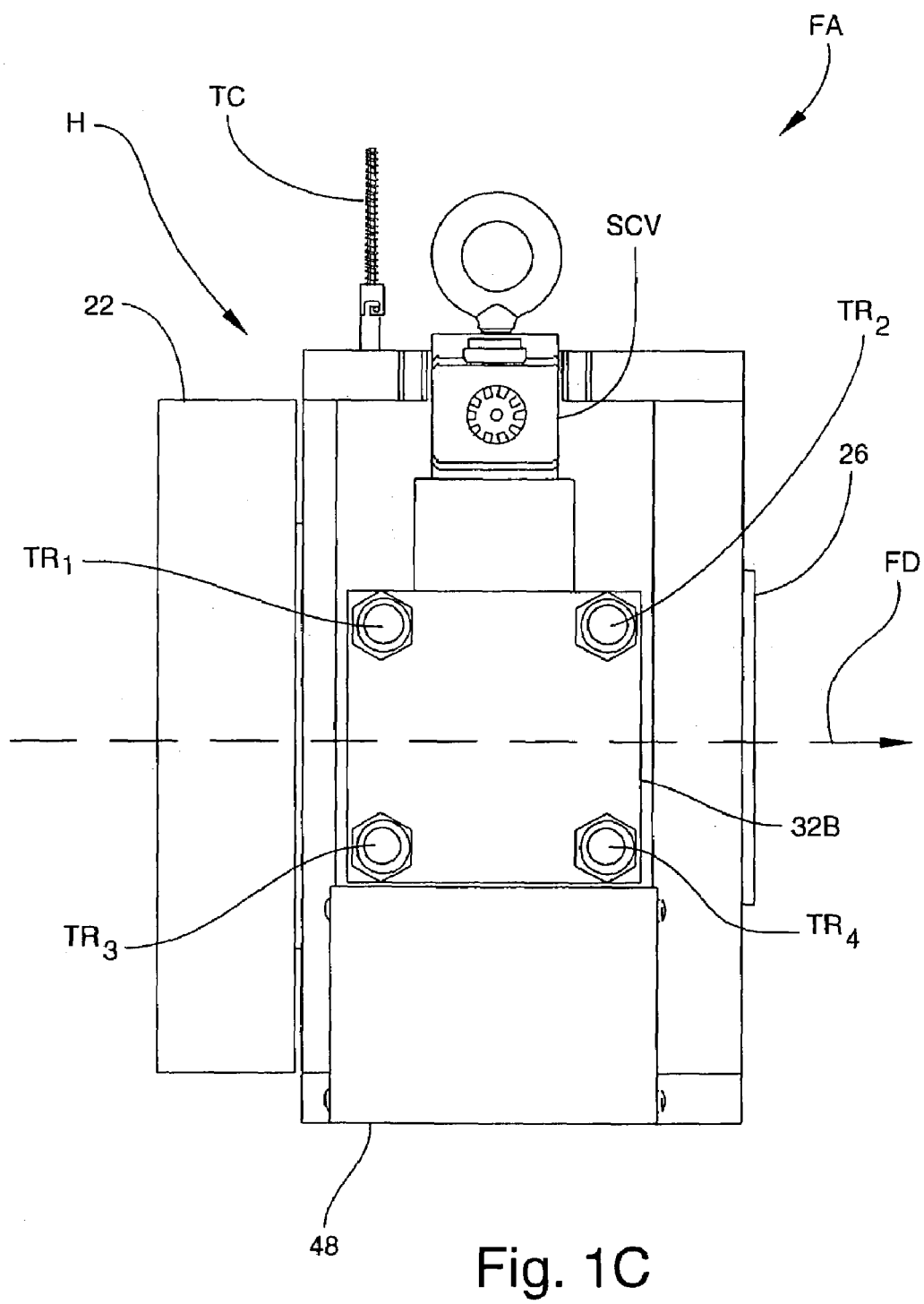
FIG. 1C is an end elevation view of the filtration apparatus.
Figure 2A:
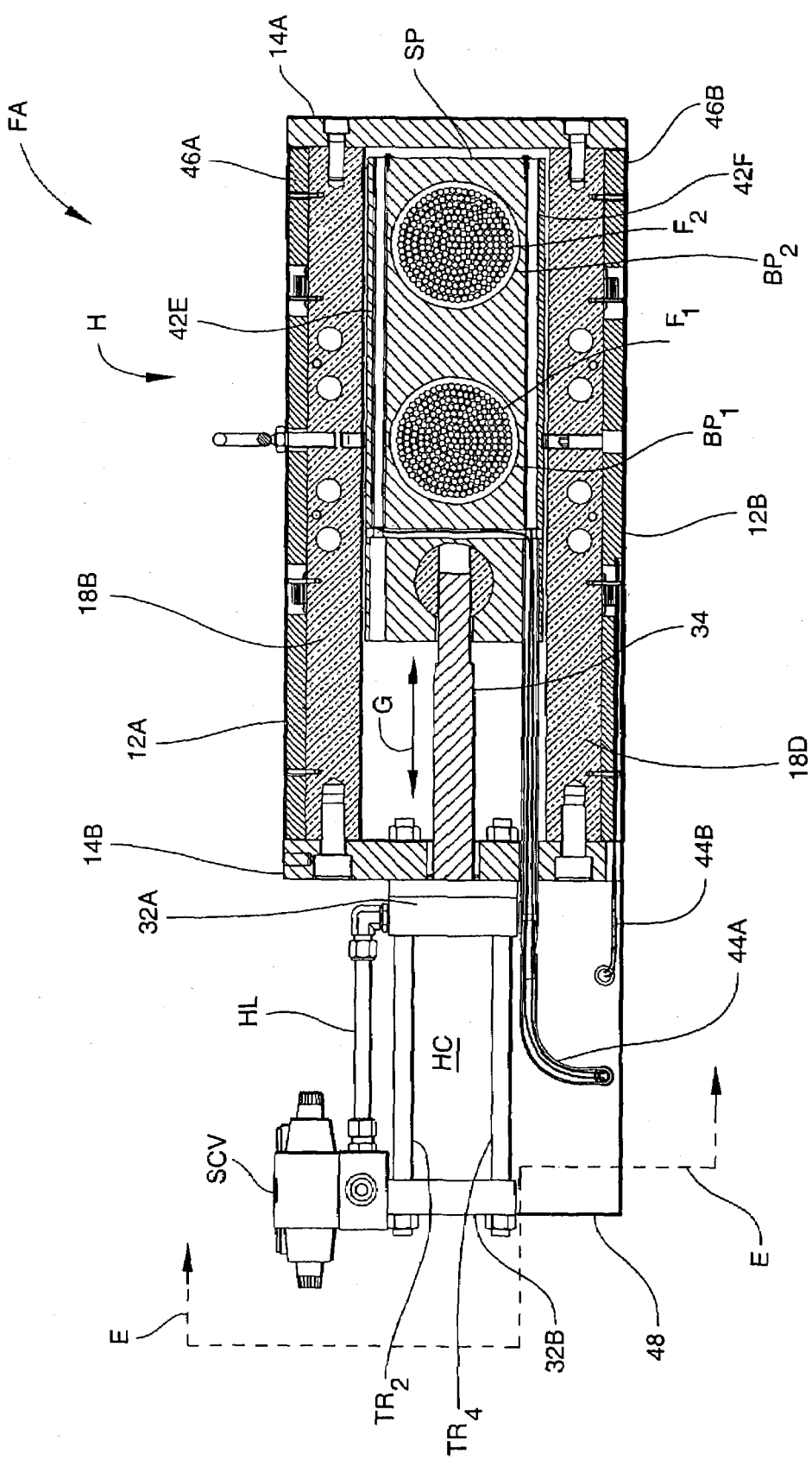
FIG. 2A is a partially cut-away rear elevation view of the filtration apparatus, taken along lines A—A in FIG. 1A.
Figure 2B:
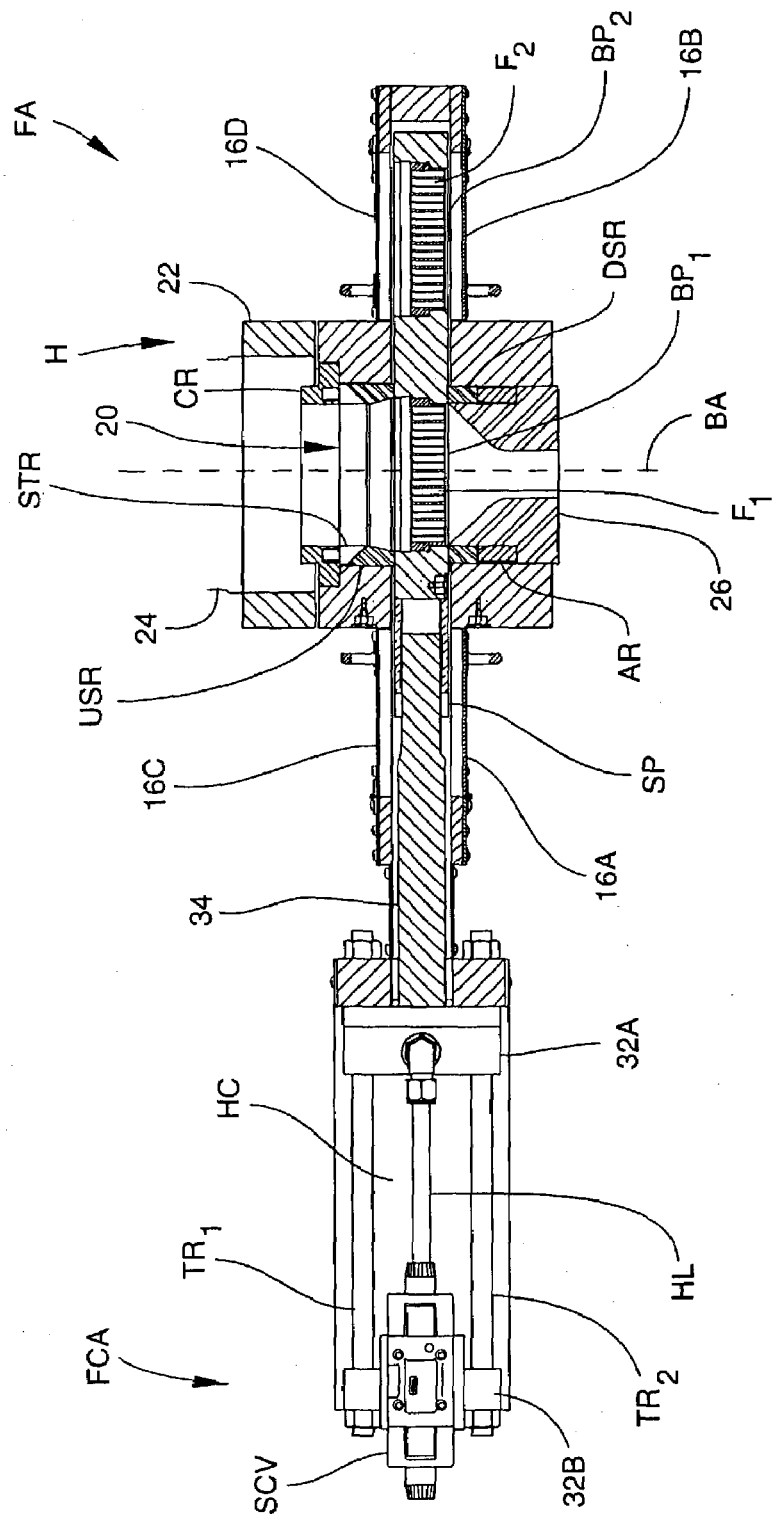
FIG. 2B is a partially cut-away top plan view of the filtration apparatus, taken along lines B—B in FIG. 1B.
Figure 3A:
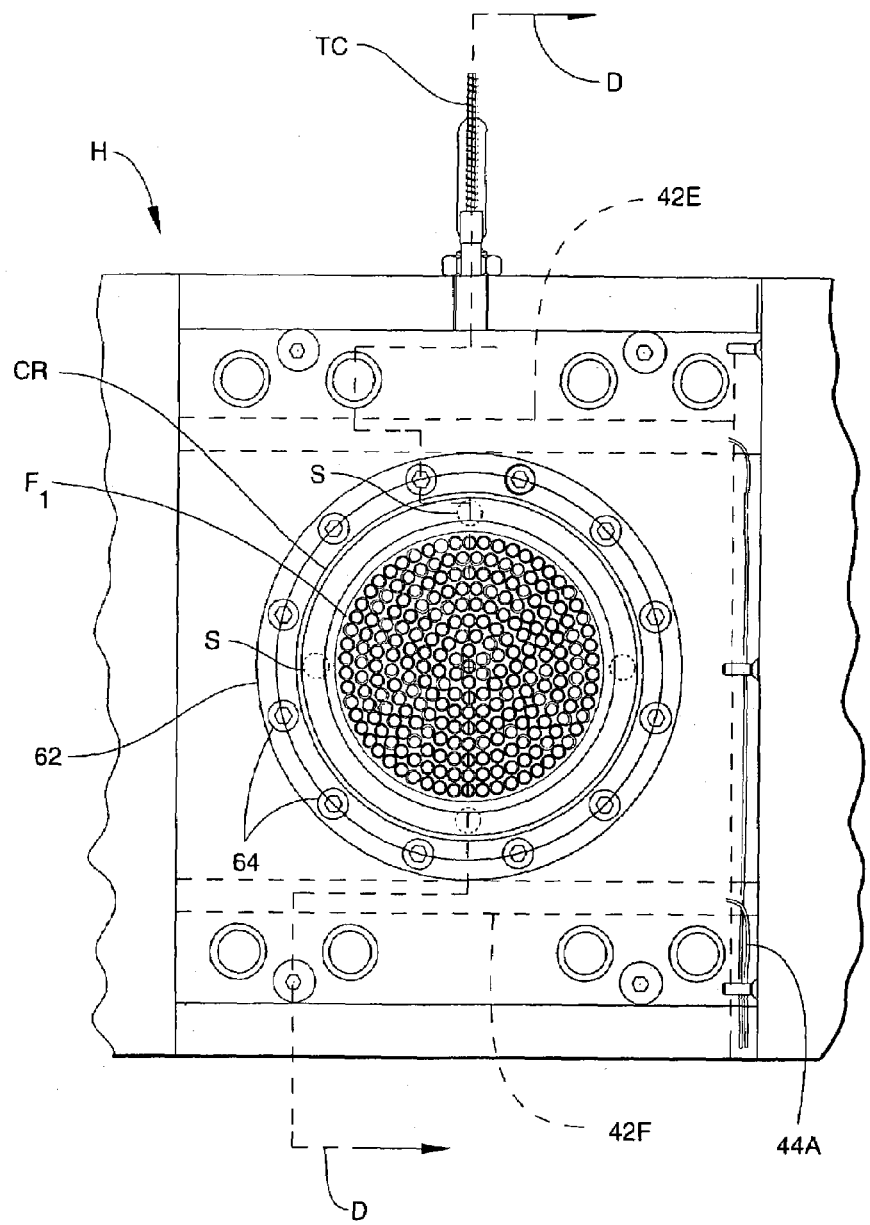
FIG. 3A is a front elevation view of an in-line filtering region of the filtration apparatus; taken along lines C—C in FIG. 1B.
Figure 3B:
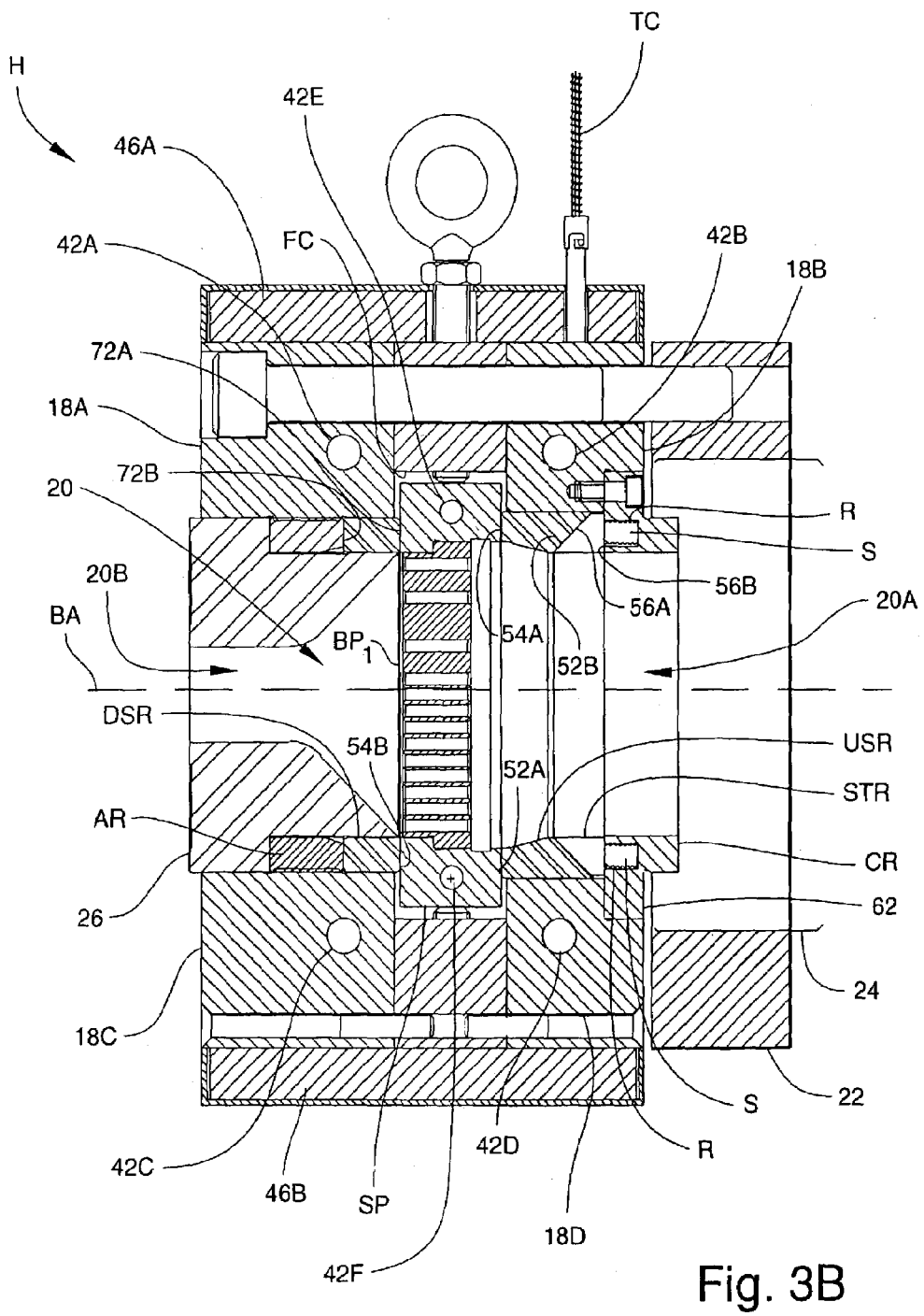
FIG. 3B is a cross-sectional view of the filtering portion of the filtration apparatus, taken along lines D—D in FIG. 3A.

As shown in FIGS. 1A and 1B, filtration apparatus FA generally comprises a housing generally designated H, and a filter changing assembly, generally designated FCA. Housing H generally includes one or more enclosing structures such as panels 12A and 12B and blocks 14A and 14B (FIG. 1A), and one or more guard doors 16A–16D. As illustrated by phantom lines in FIG. 1B, doors 16A–16D can be swung open to access filter elements $F_1$ and $F_2$ (see FIG. 2A, described in more detail hereinbelow). As shown in FIGS. 2A and 3B, housing H further includes one or more body sections 18A–18D that can be separate or unitary structures. As shown in FIG. 3B, one or more of these body sections 18A–18D define an internal flow bore generally designated 20, through which polymer melt is directed in the in-line direction. The inlet side of housing H includes an extruder barrel flange 22 suitable for connection directly to an extruder barrel 24. Alternatively, in the case where the extruder is situated at a distance upstream from filtration apparatus FA, extruder barrel flange 22 could represent an adapter for connecting the inlet side of flow bore 20 with any suitable process line or conduit. The outlet side of housing H includes an annular downstream reducer bushing 26. As shown in FIG. 2B, downstream reducer bushing 26 defines a downstream portion of flow bore 20 and is profiled to provide a smooth transition from the larger-diameter portions of flow bore 20 to any processing line or conduit coupled to downstream reducer bushing 26. As shown in FIGS. 1C, 3A and 3B one or more temperature-sensing devices such as thermocouples TC can be mounted through housing H to measure temperature at various locations within housing H.

Referring to FIGS. 1A and 1B, filter changing assembly FCA generally comprises a reciprocating device including a hydraulic cylinder HC and a suitable flow-directing actuating device such as a solenoid-operated control valve SCV. Referring also to the end view of FIG. 1C, hydraulic cylinder HC is secured to housing H using an arrangement of four bolted tie rods $TR_1$–$TR_4$ extending through end plates or blocks 32A and 32B. As appreciated by persons skilled in the art, hydraulic cylinder HC includes a suitable moving boundary such as a piston (not shown) that is actuated by the application of hydraulic pressure. Typically, hydraulic cylinder HC is of the double-acting type in which hydraulic pressure is applied to drive the piston in both reciprocating directions. In such a case, the piston typically includes a pair of opposing heads. A hydraulic fluid transfer line HL (FIGS. 1A, 1B, 2A and 2B) is coupled at both ends of hydraulic cylinder HC and fluidly communicates with solenoid-operated control valve SCV. Solenoid-operated control valve SCV switches the flow of hydraulic fluid through transfer line HL to alternately apply hydraulic pressure to one or the other end of hydraulic cylinder HC, thereby driving its piston either toward or away from housing H. As shown in FIGS. 2A and 2B, the piston within hydraulic cylinder HC in turn drives a reciprocating member 34, as represented by a double-headed arrow G in FIG. 2A. Reciprocating member 34 is secured to a filter-supporting slide plate SP, such that hydraulic cylinder HC reciprocates slide plate SP, the details of which are described hereinbelow.

Referring now to FIG. 3B, internal flow bore 20 is defined by various structures or body sections 18A–18D of housing H. As described hereinabove, downstream section 20B of flow bore 20 is further defined by downstream reducer bushing 26. Housing H further defines a filter channel FC oriented transversely to and spanning across flow bore 20. Slide plate SP is movable through filter channel FC. As shown in FIGS. 2A and 2B, mounted to slide plate SP are a pair of first and second screen supports or breaker plates $BP_1$ and $BP_2$, although an additional number of breaker plates $BP_1$ and $BP_2$ could be provided. Each breaker plate $BP_1$ and $BP_2$ respectively supports a screen or filter element $F_1$ and $F_2$ having a suitable porosity or mesh size to filter polymeric melt. First filter element $F_1$ is visible from the upstream side of housing H in FIG. 3A, and from the downstream side in FIG. 2A.

Under the control of filter changing assembly FCA (e.g., hydraulic cylinder HC and solenoid-operated control valve SCV), slide plate SP is actuated between an extended position and a retracted position. In the extended position, specifically shown in FIGS. 2A and 2B, first breaker plate $BP_1$ is positioned in-line—that is, in alignment with flow bore 20 and thus operates in the flow path to filter the polymer melt flowing therethrough. While in the extended position, second breaker plate $BP_2$ is positioned offline—that is, beyond flow bore 20 in alignment with access doors 16B and 16D farthest from hydraulic cylinder HC for cleaning and/or replacement. Although not specifically shown, it will be understood that while slide plate SP is in the retracted position, first breaker plate $BP_1$ is positioned in alignment with access doors 16A and 16C nearest to hydraulic cylinder HC for cleaning and/or replacement, and second breaker plate $BP_2$ is positioned in alignment with flow bore 20 for filtering the polymer melt stream. As appreciated by persons skilled in the art, filtration apparatus FA is designed to enable the switching of first and second breaker plates $BP_2$ during operation of the associated polymer processing system, i.e., without having to suspend the flow of polymer melt and with a minimized pressure drop within filtration assembly.

Figure 2C:
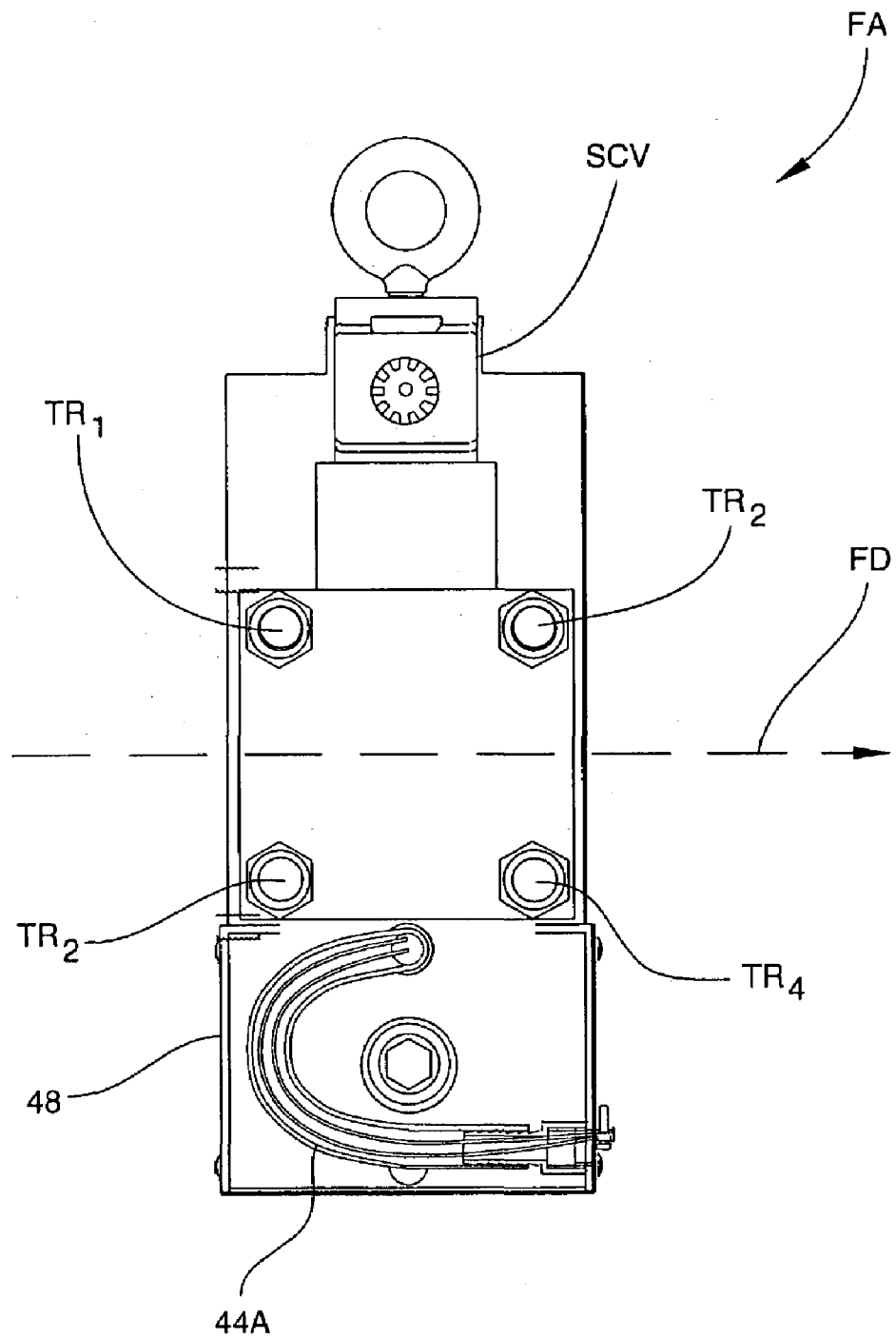
FIG. 2C is a partially cut-away end view of the filtration apparatus, taken along lines E—E in FIG. 2A.

Referring to FIGS. 2A, 3A and 3B, filtration assembly FA further comprises a heating system for maintaining the elevated temperature of the polymer melt flowing therethrough. As shown in FIG. 3B, the heating system includes one or more cartridge heater bores 42A–42D respectively formed in one or more body sections 18A–18D above and below flow bore 20. Other heater bores 42E and 42F are formed in slide plate SP. Suitable heater elements such as sets of electrical heater wires 44A and 44B (FIG. 2A) are disposed along the lengths of heater bores to conduct heat energy through body sections 18A–18D and slide plate SP to the polymer melt flowing through flow bore 20. As shown in FIGS. 2A and 3B, appropriate outer regions of housing H include thermally insulating components 46A and 46B to prevent excessive heat transfer to the periphery of housing H. As further shown in FIGS. 2A and 2C, heater wires 44A and 44B are routed to a lower housing section 48 below hydraulic cylinder HC. Heater wires 44A and 44B are positioned throughout filtration apparatus FA in a manner that protects heater wires 44A and 44B from potentially damaging polymer blow-by during the changing of breaker plates $BP_1$ and $BP_2$. Lower housing section 48 is of a sufficient size to enable heater wires 44A that move with slide plate SP to flex away from the molten polymer environment without fraying or other damage. The routing and number of heater wires 44A and 44B can be designed such that only half of slide plate SP is heated at any given time. For instance, it might be desirable to heat first or second breaker plate $BP_1$ or $BP_2$ while it is in the offline position so that the offline plate tracks the temperature of the components enclosed by housing H in the in-line area. A relay (not shown) can be wired to solenoid-operated control valve SCV to enable heater power to be switched to the half of slide plate SP that is positioned offline.

Referring now to the cross-sectional view of FIG. 3B, details regarding the sealing components of filtration apparatus FA are illustrated. In accordance with the embodiments described herein, the sealing components serve to prevent unwanted excursion of the pressurized polymer melt from flow bore 20, such as into the clearance of filter channel FC between slide plate SP and internal surfaces of housing H, and hence to prevent the loss and/or degradation of the polymer flowing through filtration apparatus FA. In particular, the sealing components prevent the leakage or migration of polymer into gaps, crevices, reliefs, voids, "hang-up" areas or the like by reducing or eliminating such gaps and by enhancing various sealing interfaces created within housing H. As a result, filtration apparatus FA disclosed herein yields a better quality polymer product and a cleaner operation as compared with conventional systems and methods.

In one embodiment, filtration apparatus FA comprises a pressure-activated sealing arrangement that employs a segmented taper ring STR. In another embodiment, filtration apparatus FA comprises a pre-sealing arrangement incorporated with a connector ring CR. In yet another embodiment, filtration apparatus FA comprises a sealing arrangement that includes an adjusting ring AR to ensure or improve line-to-line contact among the various sealing components. Additional embodiments comprise combinations of the sealing arrangements just summarized.

More specifically, in FIG. 3B, the sealing components utilized in accordance with one or more of the embodiments of filtration apparatus FA includes an upstream seal ring USR, a downstream seal ring DSR, a segmented taper ring STR, a connector ring CR, and an adjusting ring AR. Slide plate SP can be considered as partitioning the flow bore 20 into an upstream flow bore section generally designated 20A, and a downstream flow bore section generally designated 20B. Accordingly, upstream seal ring USR, segmented taper ring STR, and connector ring CR are disposed within upstream flow bore section 20A, i.e., upstream of slide plate SP and filter channel FC. Also, downstream seal ring DSR and adjusting ring AR are disposed within downstream flow bore section 20B, i.e., downstream of slide plate SP and filter channel FC. Upstream seal ring USR, downstream seal ring DSR, segmented taper ring STR, connector ring CR, and adjusting ring AR are axially stacked together on either side of slide plate SP, and designed so as to eliminate gaps at their respective sealing interfaces with each other. Moreover, upstream seal ring USR, downstream seal ring DSR, segmented taper ring STR, connector ring CR, and adjusting ring AR are axially stacked together and designed to provide as tight a seal as possible against an upstream slide plate surface 54A and a downstream slide plate surface 54B of slide plate SP, but without impairing the ability of slide plate SP to be reciprocated through filter channel FC during the change-out of breaker plates $BP_1$ and $BP_2$.

Each of upstream seal ring USR, downstream seal ring DSR, segmented taper ring STR, connector ring CR, and adjusting ring AR is annular, and thus is generally coaxially disposed about a central bore axis BA of flow bore 20. Given that upstream seal ring USR, segmented taper ring STR, and connector ring CR are annular, the flow of polymer melt through upstream flow bore section 20A is bounded by the respective inside diameters of these sealing components and their seal interfaces. Hence, upstream seal ring USR, segmented taper ring STR, and connector ring CR can be considered as defining, at least in part, upstream flow bore section 20A. On the other hand, at least one advantageous embodiment of filtration apparatus FA includes downstream reducer bushing 26 to define downstream flow bore section 20B. In such a case, downstream seal ring DSR and adjusting ring AR are disposed about an outside surface of downstream reducer bushing 26, such as at a reduced-diameter section thereof, and thus are radially interposed between downstream reducer bushing 26 and body sections 18A and 18C of housing H.

With continuing reference to FIG. 3B, upstream seal ring USR comprises on one side thereof a first upstream seal surface 52A facing the downstream direction and, on an opposing side, a second upstream seal surface 52B facing the upstream direction. Upstream seal ring USR forms a seal with slide plate SP by contacting first upstream seal surface 52A with upstream slide plate surface 54A. Second upstream seal surface is chamfered to present an angle relative to bore axis BA, such that second upstream seal surface 52B opens outwardly in the upstream direction. Segmented taper ring STR comprises on one side thereof a tapered ring surface 56A facing the downstream direction and, on an opposing side, an upstream-side ring surface 56B facing the upstream direction. Tapered ring surface 56A is chamfered to present an angle relative to bore axis BA that is complementary to the angle of second upstream seal surface 52B of upstream seal ring USR. As a result, segmented taper ring STR forms a seal with upstream seal ring USR by contacting tapered ring surface 56A with second upstream seal surface 52B, thereby forming an oblique seal interface.

Figure 4B:
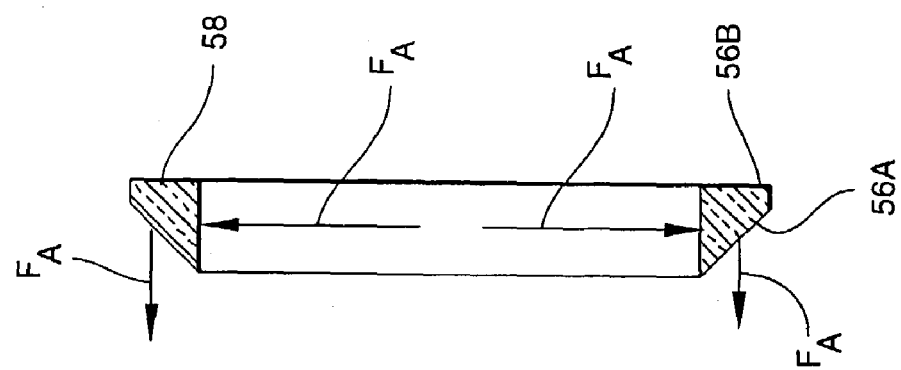
FIG. 4B is a cross-sectional view of the segmented taper ring illustrated in FIG. 4A.
Figure 4A:
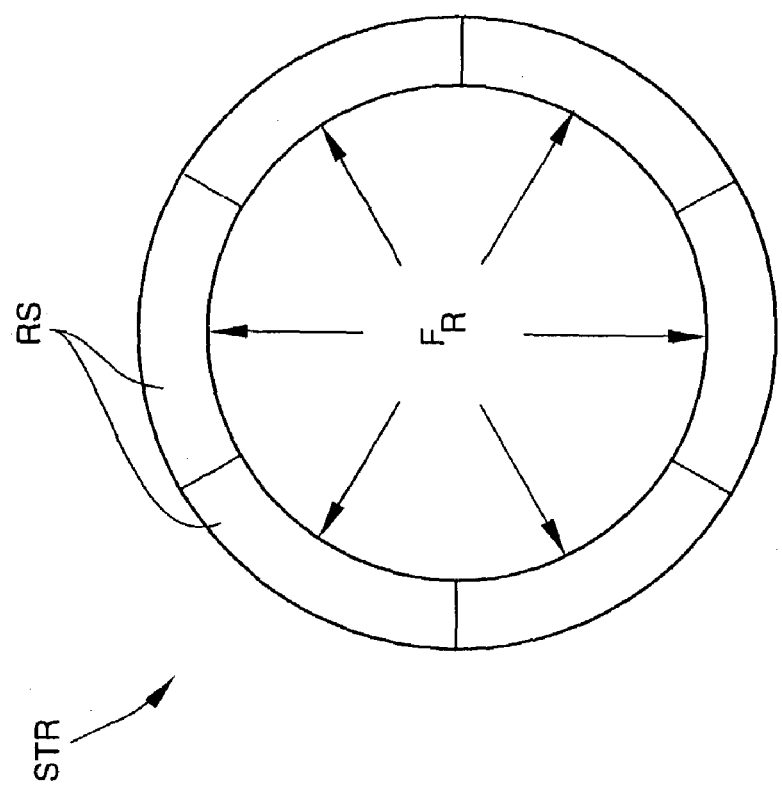
FIG. 4A is a front elevation view of a segmented taper ring disclosed herein.

Segmented taper ring is generally designated STR in FIGS. 4A and 4B. Referring to FIG. 4A, segmented taper ring STR is formed by arranging together a plurality of individual, arcuate ring segments RS. It can be seen from FIG. 4B that each ring segment RS has a uniform cross-section 58. Thus, the tapered ring surface 56A and upstream-side ring surface 56B of segmented taper ring STR are respectively the result of the individual tapered surfaces 56A and upstream-side surfaces 56B presented by each ring segment RS. Each ring segment RS frictionally contacts, but is not physically secured to, adjacent ring segments RS. As a result, some degree of freedom of movement of ring segments RS relative to each other remains after ring segments RS are arranged into segmented taper ring STR. As shown in FIGS. 4A and 4B, pressure from the polymer melt flowing through flow bore 20 (FIG. 3B) imparts radial forces $F_R$ on each individual ring segment RS, thereby creating a tendency for each ring segment RS to move radially outwardly. However, as shown in FIG. 3B, the outer diameter of segmented taper ring STR is constrained by body sections 18B and 18D of housing H. Therefore, as shown in FIG. 4B, due to the oblique or beveled profile of tapered ring surface 56A, each ring segment RS imparts a pressure-driven axial force component FA. As a result, and as can be observed from FIG. 3B, the polymer pressure causes segmented taper ring STR to bias upstream seal ring USR towards slide plate SP, thereby significantly improving the sealing interface between upstream seal ring USR and slide plate SP.

Referring to FIG. 3B, segmented taper ring STR is constrained from moving in the upstream direction away from upstream seal ring USR by connector ring CR. In one embodiment, connector ring CR is fixedly mounted to housing H by securing a flanged section 62 of connector ring CR to one or more body sections 18B and 18D of housing H using axially oriented fastening members such as bolts 64 (see FIG. 3A). The downstream end of extruder barrel 24 is fitted between connector ring CR and extruder barrel flange 22. In one embodiment, connector ring CR serves a pre-sealing function by providing a biasing device, such as one or more biasing components S, suitable for axially biasing segmented taper ring STR against upstream seal ring USR and thus upstream seal ring USR against slide plate SP. The biasing effect provided by connector ring CR creates a "pre-seal" in the sense that it is independent of polymer pressure. That is, the pre-seal can be established by connector ring CR in the absence of polymer melt flowing through filtration apparatus FA. In the embodiment illustrated in FIG. 3B, biasing components S are provided in the form of compression springs disposed in respective blind mounting bores or recesses R of connector ring CR, although filtration apparatus FA disclosed herein is not limited this type of biasing component or any particular mounting method. In the example illustrated in FIG. 3A, four biasing components S are circumferentially arranged around the body of connector ring CR, although it will be understood that more or less biasing components S could be provided. For instance, one biasing component could be provided for each ring segment RS (e.g., six as shown in FIG. 4A).

Referring back to FIG. 3B, downstream seal ring DSR comprises on one side thereof a first downstream seal surface 72A facing the upstream direction and, on an opposing side, a second downstream seal surface 72B facing the downstream direction. Downstream seal ring DSR forms a seal with slide plate SP by contacting first downstream seal surface 72A with downstream slide plate surface 54B. Downstream seal ring DSR is radially interposed between downstream reducer bushing 26 and body sections 18A and 18C of housing H. In one embodiment, downstream seal ring DSR is axially retained by any suitable means. In another advantageous embodiment, adjusting ring AR is provided in contact with a second downstream seal surface 72B of downstream seal ring DSR. Adjusting ring AR is axially adjustable along the length of upstream flow bore section 20A by any suitable means. In one example, the inside diameter of adjusting ring AR is in threaded engagement with the outside diameter of downstream reducer bushing 26, and thus can be adjusted by turning. The respective mating threads of adjusting ring AR and downstream reducer bushing 26 are not specifically shown in FIG. 3B. Adjusting ring AR can be adjusted in the upstream direction to bias downstream seal ring DSR against slide plate SP. Adjustment of adjusting ring AR can improve line-to-line contact between the various sealing components and consequently their sealing effectiveness by eliminating gaps in which polymer could stagnate. In some embodiments, the use of adjusting ring AR can render the use of biasing components S of connector ring CR unnecessary.

In at least one embodiment of filtration apparatus FA, as many components of filtration apparatus FA as possible that are subject to the conduction or convection of heat energy are constructed from the same material, such as for example 4140 steel, so as to have the same coefficient of thermal expansion. By ensuring uniform rates of material dilation or expansion, the creation of gaps or other discontinuities to which polymer could migrate is further prevented. Such components could include, for example, slide plate SP, upstream seal ring USR, downstream seal ring DSR, segmented taper ring STR, connector ring CR, adjusting ring AR, downstream reducer bushing 26, and body sections 18A–18D.

It can be seen from the foregoing that filtration apparatus FA provides an axially stacked arrangement of sealing components in the area of its flow bore 20 that constrains the flow of polymer melt to the flow bore 20. As a result, polymer melt is prevented from migrating out from flow bore 20 into potential hang-up areas in which the polymer material could stagnate and become degraded. The pressure imparted by the flow of polymer melt is advantageously utilized to enhance sealing capability, but the polymer material itself is not utilized to form or enhance sealing interfaces.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A filtration apparatus for use in polymer processing systems, comprising:
   (a) a housing having an internal bore for directing a polymer flow in a channel oriented transversely to the bore;
   (b) a slide plate movable through the channel and across the bore and comprising an upstream slide plate surface, a downstream slide plate surface, and at least one filter element;
   (c) an upstream seal ring annularly disposed about a central bore axis of the bore and comprising first and second opposing upstream seal surfaces, the first upstream seal surface facing downstream for sealably contacting the upstream slide plate surface, and the second upstream seal surface angled with respect to the bore axis; and
   (d) a plurality of separate and individual ring segments arranged in frictional engagement with each other to form a segmented ring annularly disposed about the bore axis, each ring segment comprising a tapered ring surface generally complementarily angled relative to and sealably contacting the second upstream seal surface.

2. The apparatus according to claim 1 comprising an annular downstream seal ring comprising a first downstream seal surface sealably contacting the downstream slide plate surface of the slide plate.

3. The apparatus according to claim 2 comprising an annular adjustment ring sealably contacting a second downstream seal surface of the downstream seal ring opposing the first downstream seal surface, the adjustment ring being axially adjustable along the bore for biasing the downstream seal ring against the slide plate.

4. The apparatus according to claim 3 comprising an annular bushing disposed in the housing and defining a downstream section of the bore, wherein the downstream seal ring and the adjustment ring are coaxially disposed about the bushing.

5. The apparatus according to claim 4 wherein the adjustment ring threadly engages an outer surface of the bushing.

6. The apparatus according to claim 1 wherein the ring segments are constructed of a metal.

7. The apparatus according to claim 6 wherein the ring segments are constructed of a steel.

8. The apparatus according to claim 1 comprising an annular connector ring contacting the plurality of ring segments, wherein the ring segments are axially interposed between the upstream seal and the connector ring.

9. The apparatus according to claim 8 wherein the connector ring is secured to the housing with axially oriented fastening members.

10. The apparatus according to claim 8 wherein the connector ring comprises a biasing device contacting the ring segments for axially biasing the ring segments against the upstream seal ring.

11. The apparatus according to claim 10 wherein the biasing device comprises a plurality of biasing components circumferentially arranged about the bore axis.

12. The apparatus according to claim 11 wherein the biasing components comprise compression springs.

13. The apparatus according to claim 11 wherein the connector ring has a plurality of mounting recesses and each biasing component is disposed in a respective recess.

14. A filtration apparatus for use in polymer processing systems, comprising:
   (a) a housing having an internal bore for directing a polymer flow in a channel oriented transversely to the bore;
   (b) a slide plate moveable through the channel and across the bore and comprising an upstream slide plate surface, a downstream slide plate surface, and at least one filter element;
   (c) an upstream seal ring annularly disposed about a central bore axis of the bore and comprising first and second opposing upstream seal surfaces, the first upstream seal surface facing downstream for sealably contacting the upstream slide plate surface, and the second upstream seal surface angled with respect to the bore axis;
   (d) a plurality of separate and individual ring segments arranged in frictional engagement with each other to form a segmented ring annularly disposed about the bore axis, each ring segment comprising a tapered ring surface generally complementarily angled relative to and sealably contacting the second upstream seal surface;
   (e) a downstream seal ring annularly disposed about the bore axis, the downstream seal ring comprising a first downstream seal surface facing upstream for sealably contacting the downstream slide plate surface, and an opposing second downstream seal surface; and
   (f) an adjustment ring annularly disposed about the bore axis and sealably contacting the second downstream seal surface, the adjustment ring being axially adjustable along the bore for biasing the downstream seal ring against the slide plate.

15. The apparatus according to claim 14 comprising a annular bushing disposed in the housing and defining a downstream section of the bore, wherein the downstream seal ring and the adjustment ring are coaxially disposed about the bushing.

16. The apparatus according to claim 15 wherein the adjustment ring threadly engages an outer surface of the bushing.

17. The apparatus according to claim 14 comprising an annular connector ring contacting the plurality of ring segments, wherein the ring segments are axially interposed between the upstream seal ring and the connector ring.

18. A filtration apparatus for use in polymer processing systems, comprising;
  (a) a housing having an internal bore for directing a polymer flow in a channel oriented transversely to the bore;
  (b) a slide plate movable through the channel and across the bore and comprising an upstream slide plate surface, a downstream slide plate surface, and at least one filter element;
  (c) an upstream seal ring annularly disposed about a central bore axis of the bore and comprising first and second opposing upstream seal surfaces, the first upstream seal surface facing downstream for sealably contacting the upstream slide plate surface, and the second upstream seal surface angled with respect to the bore axis;
  (d) a plurality of separate and individual ring segments arranged in frictional engagement with each other to form a segmented ring annularly disposed about the bore axis, each ring segment comprising a tapered ring surface generally complementarily angled relative to and sealably contacting the second upstream seal surface; and
  (e) a connector ring annularly disposed about the bore axis and sealably contacting the ring segments, wherein the ring segments are axially interposed between the upstream seal and the connector ring.

19. The apparatus according to claim 18 wherein the connector ring comprises a biasing device contacting the ring segments for axially biasing the ring segments against the upstream seal ring.

20. The apparatus according to claim 18 wherein the biasing device comprises a plurality of biasing components circumferentially arranged about the bore axis.

21. The apparatus according to claim 20 wherein the biasing components comprise compression springs.

22. The apparatus according to claim 20 wherein the connector ring has a plurality of mounted recesses and each biasing components is disposed in a respective recess.

23. The apparatus according to claim 18 comprising an annular downstream seal ring comprising a first downstream seal surface sealably contacting the downstream slide plate surface of the slide plate.

24. The apparatus according to claim 23 comprising an annular adjustment ring sealably contacting a second downstream seal surface of the downstream seal ring opposing the first downstream seal surface, the adjustment ring being axially adjustable along the bore for biasing the downstream seal ring against the slide plate.

* * * * *